(12) United States Patent
Laas et al.

(10) Patent No.: US 11,407,852 B2
(45) Date of Patent: Aug. 9, 2022

(54) MODIFIED POLYISOCYANATE

(71) Applicant: Covestro Intellectual Property GmbH & Co. KG, Leverkusen (DE)

(72) Inventors: Hans-Josef Laas, Odenthal (DE); Hao Liu, Shanghai (CN); Na Xu, Shanghai (CN); Guoping Shi, Guangdong (CN); Yaguang Ma, Shanghai (CN); Tian Xia, Shanghai (CN)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/294,802

(22) PCT Filed: Nov. 25, 2019

(86) PCT No.: PCT/EP2019/082334
§ 371 (c)(1),
(2) Date: May 18, 2021

(87) PCT Pub. No.: WO2020/109189
PCT Pub. Date: Jun. 4, 2020

(65) Prior Publication Data
US 2021/0355264 A1  Nov. 18, 2021

(30) Foreign Application Priority Data

Nov. 30, 2018 (CN) .......... 201811463491.8
Mar. 29, 2019 (CN) .......... 201910256348.X

(51) Int. Cl.
| C08G 18/73 | (2006.01) |
| C08G 18/08 | (2006.01) |
| C08G 18/18 | (2006.01) |
| C08G 18/48 | (2006.01) |
| C09D 175/12 | (2006.01) |
| C09J 175/12 | (2006.01) |
| C09K 3/10 | (2006.01) |

(52) U.S. Cl.
CPC ......... *C08G 18/73* (2013.01); *C08G 18/0828* (2013.01); *C08G 18/1816* (2013.01); *C08G 18/4829* (2013.01); *C09D 175/12* (2013.01); *C09J 175/12* (2013.01); *C09K 3/1021* (2013.01); *C09K 2200/065* (2013.01)

(58) Field of Classification Search
None
See application file for complete search history.

(56) References Cited

U.S. PATENT DOCUMENTS

| 3,996,223 A | 12/1976 | Gupta et al. |
| 4,255,569 A | 3/1981 | Mueller et al. |
| 4,837,359 A | 6/1989 | Woynar et al. |
| 4,960,848 A | 10/1990 | Scholl et al. |
| 4,994,541 A | 2/1991 | Dell et al. |
| 5,064,960 A | 11/1991 | Pedain et al. |
| 5,076,958 A | 12/1991 | Pedain et al. |
| 5,098,983 A | 3/1992 | Bosbach et al. |
| 5,334,637 A | 8/1994 | Zwiener et al. |
| 5,473,011 A | 12/1995 | Laas et al. |
| 5,914,383 A | 6/1999 | Richter et al. |
| 6,090,939 A | 7/2000 | Richter et al. |
| 6,426,414 B1 | 7/2002 | Laas et al. |
| 6,767,958 B2 | 7/2004 | Laas et al. |
| 9,975,985 B2 | 5/2018 | Ji et al. |
| 2010/0183883 A1 | 7/2010 | Schaefer et al. |
| 2011/0065827 A1 | 3/2011 | Faecke et al. |
| 2012/0041142 A1 | 2/2012 | Nennemann et al. |
| 2012/0101210 A1 | 4/2012 | Nennemann et al. |
| 2016/0280836 A1* | 9/2016 | Ji .................. C08G 18/8096 |

FOREIGN PATENT DOCUMENTS

| DE | 2414413 A1 | 10/1975 |
| EP | 0962455 A1 | 12/1999 |
| EP | 3428207 A1 | 1/2019 |
| EP | 3560975 A1 | 10/2019 |
| EP | 3560976 A1 | 10/2019 |
| GB | 1145952 A | 3/1969 |
| GB | 1244416 A | 9/1971 |
| WO | 2017154963 A1 | 9/2017 |

OTHER PUBLICATIONS

J. Prakt .Chem. 336 (1994) 185-200.
Ullmanns Encyclopaedie der technischen Chemie, 4th edition, vol. 19, Verlag Chemie Weinheim, pp. 31-38.
International Search Report, PCT/EP2019/082334, dated Feb. 20, 2020, Authorized officer: Sandra Lanz.

* cited by examiner

Primary Examiner — Jeffrey D Washville
(74) Attorney, Agent, or Firm — John E. Mrozinski, Jr.

(57) ABSTRACT

The present invention relates to a modified polyisocyanate and use thereof, in particular as a crosslinking component of water-soluble or water-dispersible coatings. The modified polyisocyanate is obtained by a reaction of a system comprising the following components: at least an aminosulfonic acid; at least a polyisocyanate; at least a tertiary amine; and optionally a polyether alcohol containing an ethylene oxide group. The modified polyisocyanate comprises at least an iminooxadiazinedione structure and at least an isocyanurate structure, the weight ratio of the iminooxadiazinedione structure to the isocyanurate structure being 1:300 to 1:5. The amount of sulfonate group of the modified polyisocyanate is 0.75% by weight to 1.1% by weight, based on the amount of the modified polyisocyanate as 100% by weight. The viscosity thereof is 500 mPa·s to 10000 mPa·s, as determined according to DIN EN ISO 3219:1994-10 at a temperature of 23° C. and a shear rate of 10 s$^{-1}$. The coating comprising the modified polyisocyanate of the present invention can be manually stirred well, and the resulting coating layer has high gloss and good transparency.

20 Claims, No Drawings

MODIFIED POLYISOCYANATE

CROSS REFERENCE TO RELATED APPLICATIONS

This application is a national stage application under 35 U.S.C. §371 of PCT/EP2019/082334, filed Nov. 25, 2019, which claims benefit of Chinese Application No. 201811463491.8, filed Nov. 30, 2018 and Chinese Application No. 201910256348.X, filed Mar. 29, 2019, all of which are incorporated herein by reference in their entireties.

FIELD OF THE INVENTION

The present invention relates to a modified polyisocyanate and use thereof, in particular as a cross-linking component of water-soluble or water-dispersible coatings.

BACKGROUND OF THE INVENTION

In recent years, water-dispersible modified polyisocyanates have become increasingly important in various fields of application in response to increasingly stringent environmental regulations in various countries. Water-dispersible modified polyisocyanates are often used as a cross-linking component in aqueous two-component coatings or aqueous dispersion adhesives, sealants. Water-dispersible modified polyisocyanates are used in textile finishing or formaldehyde-free textile printing inks for crosslinking of aqueous dispersions and, in addition, are used as an auxiliary for wet-strengthening treatment of papers (see, for example, EP-A0959087 and literatures cited therein).

Currently, water-dispersible modified polyisocyanates can be broadly classified into two types: nonionically modified and ionically modified types. Nonionically modified polyisocyanates, especially polyether modified polyisocyanates, are widely used, but they still have a lot of disadvantages. For example, since a very high viscosity is to be overcome during dispersion, only a relatively large shear force (e.g., high speed stirring) can be applied to obtain a uniform dispersion in water. For another example, when such a polyether modified polyisocyanate is used as a crosslinking agent in an aqueous two-component coating, a relatively large amount of polyethers are generally introduced so that better dispersibility can be achieved. On one hand, the water resistance of the coating layer formed from the coating is affected permanently. On the other hand, the concentration of isocyanate in the polyether modified polyisocyanate is significantly reduced, and the crosslinking density is reduced.

In order to overcome the above disadvantages, attempts have been made to use ionically modified polyisocyanates.

The water-dispersible carboxylic acid group-modified polyisocyanate is obtained, for example, by introducing a carboxylic acid group into polyisocyanate structure (EP-A 0443138, EP-A 0510438 and EP-A 0548669). The carboxylic acid group-modified polyisocyanate can be dispersed into water by stirring without using high shear force. However, it's storage stability is relatively poor, especially after the carboxylic acid group is neutralized. Because the carboxylate group has a certain catalytic activity which leads to the polymerization of isocyanate groups at room temperature, for example, with trimerization to polyisocyanurate, or formation of α-polyamide structure. This causes gelation of the carboxylic acid group-modified polyisocyanate, resulting in poor storage stability.

Another example is a water-dispersible sulfonic acid group-modified polyisocyanate which is obtained by modifying a polyisocyanate with a sulfonic acid group. CN101754990A discloses a process for modifying a polyisocyanate using 4-aminotoluene-2-sulfonic acid containing a benzene ring. The obtained sulfonic acid group-modified polyisocyanate has better water dispersibility than that of a carboxylic acid group-modified polyisocyanate. However, the benzene ring present therein reduces the yellowing resistance of the coating layer formed. CN1190450C discloses the preparation of a modified polyisocyanate using 3-cyclohexylaminopropanesulfonic acid and 2-(cyclohexylamino)-ethanesulfonic acid as hydrophilic modifying agents, a tertiary amine as a phase transfer catalyst and a neutralizing agent. CN104448232 discloses the preparation of a modified polyisocyanate using 4-(cyclohexylamino)-butanesulfonic acid as a hydrophilic modifying reagent and a tertiary amine as a phase transfer catalyst to obtain the modified polyisocyanate.

The above sulfonic acid group-modified polyisocyanate can be dispersed into water without very high shear force. However, in actual operation, operators still need to firstly dilute the sulfonic acid group-modified polyisocyanate with a solvent to an extent of 70-80% to reduce its viscosity, then mix it with other coating components, and disperse by manual stirring to obtain the coating. The addition of the solvent may significantly increase the VOC content of the coating, causing damage to the environment and the human body.

Therefore, there is a need in the industry for a modified polyisocyanate that can be manually stirred well and shows good dispersibility without solvent dilution.

SUMMARY OF THE INVENTION

It is an object of the present invention to provide a modified polyisocyanate and use thereof, especially as a cross-linking component of water-soluble or water-dispersible coatings.

The modified polyisocyanate of the present invention is obtained by a reaction of a system comprising the following components:

a. at least an aminosulfonic acid represented by the formula I;

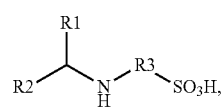

wherein,

R1 and R2 independently represents hydrogen, an aliphatic group having 1 to 18 carbon atoms which is substituted or unsubstituted and/or contains a heteroatom, a cycloaliphatic group having 3 to 18 carbon atoms which is substituted or unsubstituted and/or contains a heteroatom, an aromatic group having 1 to 18 carbon atoms which is substituted or unsubstituted and/or contains a heteroatom; R1 and R2 can react with each other to form a cycloaliphatic group having 3 to 8 carbon atoms or a heterocyclic group having 3 to 8 carbon atoms substituted by an oxygen atom or a nitrogen atom;

R3 represents a linear or branched aliphatic group having 2 to 8 carbon atoms;
b. at least a polyisocyanate;
c. at least a tertiary amine; and
d. optionally a polyether alcohol containing an ethylene oxide group;

wherein the modified polyisocyanate comprises at least an iminooxadiazinedione structure and at least an isocyanurate structure, the weight ratio of the iminooxadiazinedione structure to the isocyanurate structure being 1:300 to 1:5; the amount of the sulfonate group (sulfonate group means SO3− having molar weight of 80 g/mol) of the modified polyisocyanate is 0.75% by weight to 1.1% by weight, based on the amount of the modified polyisocyanate as 100% by weight; the viscosity of the modified polyisocyanate is 500 mPa·s to 10000 mPa·s, as determined according to DIN EN ISO 3219:1994-10 at 23° C. and a shear rate of 10 s$^{-1}$.

According to an aspect of the present invention, a process for preparing a modified polyisocyanate of the present invention is provided, wherein the component a, component b and optionally component d react in the presence of component c to give said modified polyisocyanate.

According to a further aspect of the present invention, use of a modified polyisocyanate of the present invention as a starting component in the preparation of a polyurethane is provided.

According to a further aspect of the present invention, use of a modified polyisocyanate of the present invention as a crosslinking component in water-soluble or water-dispersible coatings, adhesives or sealants is provided.

According to a further aspect of the present invention, use of a modified polyisocyanate of the present invention as a starting component for the preparation of a polyisocyanate blocked by a blocking agent is provided.

According to yet another aspect of the present invention, a coating, an adhesive or a sealant comprising a modified polyisocyanate of the present invention is provided.

According to yet another aspect of the present invention, a substrate coated with a coating, an adhesive or a sealant of the present invention is provided.

According to yet another aspect of the present invention, use of a modified polyisocyanate of the present invention for improving the manual stirring behavior of coatings, adhesives or sealants is provided.

According to yet another aspect of the present invention, use of a modified polyisocyanate of the present invention as a crosslinking component in water-soluble or water-dispersible aqueous two-component coatings is provided.

According to still another aspect of the present invention, an aqueous two-component coating is provided, which comprises: at least an aqueous hydroxy resin dispersion, at least a modified polyisocyanate of the present invention, optionally an auxiliary and optionally an additive.

According to still another aspect of the present invention, a process for preparing an aqueous two-component coating is provided, which comprises the steps of: mixing an aqueous hydroxy resin dispersion, optionally an auxiliary, and optionally an additive in any manner to obtain a mixture, and mixing the modified polyisocyanate of the present invention and said mixture, and stirring manually to obtain the aqueous two-component coating.

According to still another aspect of the present invention, a product is provided, which comprises a substrate and a coating formed by applying the aqueous two-component coating of the present invention to the substrate. The product is preferably furniture.

According to still another aspect of the present invention, a process for producing a product is provided, comprising the step of applying the aqueous two-component coating of the present invention to a substrate, followed by curing and drying.

The modified polyisocyanate of the present invention can be directly mixed with other coating components without solvent dilution, and can be uniformly dispersed in a resin system by simple manual stirring to obtain a coating, and the coating layer formed from the coating has good gloss and transparency.

No addition of a solvent is required for dispersion of the modified polyisocyanate during the preparation of a coating, an adhesive or a sealant comprising the modified polyisocyanate of the present invention by mixing. Therefore, the obtained coating, adhesive or sealant has a low VOC content.

Therefore, the present invention actually provides a modified polyisocyanate which can be manually stirred well and has good dispersibility. A coating layer formed from a coating comprising said modified polyisocyanate has high gloss and good transparency.

DETAILED DESCRIPTION OF THE INVENTION

The present invention provides a modified polyisocyanate obtained by a reaction of a system comprising the following components:
a. at least an aminosulfonic acid represented by the formula I;

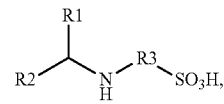

wherein,
R1 and R2 independently represents hydrogen, an aliphatic group having 1 to 18 carbon atoms which is substituted or unsubstituted and/or contains a heteroatom, a cycloaliphatic group having 3 to 18 carbon atoms which is substituted or unsubstituted and/or contains a heteroatom, an aromatic group having 1 to 18 carbon atoms which is substituted or unsubstituted and/or contains a heteroatom; R1 and R2 can react with each other to form a cycloaliphatic group having 3 to 8 carbon atoms or a heterocyclic group having 3 to 8 carbon atoms substituted by an oxygen atom or a nitrogen atom;
R3 represents a linear or branched aliphatic group having 2 to 8 carbon atoms;
b. at least a polyisocyanate;
c. at least a tertiary amine; and
d. optionally a polyether alcohol containing an ethylene oxide group;

wherein the modified polyisocyanate comprises at least an iminooxadiazinedione structure and at least an isocyanurate structure, the weight ratio of the iminooxadiazinedione structure to the isocyanurate structure being 1:300 to 1:5; the amount of the sulfonate group (sulfonate group means SO3− having molar weight of 80 g/mol) of the modified polyisocyanate is 0.75% by weight to 1.1% by weight, based on the amount of the modified polyisocyanate as 100% by weight; the viscosity of the modified polyisocyanate is 500 mPa·s to 10000 mPa·s, as determined according to DIN EN ISO 3219:1994-10 at 23° C. and a shear rate of 10 s$^{-1}$.

The present invention also provides a process for preparing the modified polyisocyanate and use of the modified polyisocyanate for the preparation of a polyurethanes or blocking agent-blocked polyisocyanates, for the preparation of water-soluble or water-dispersible coatings, adhesives or sealants, and for improving the manual stirring behavior of coatings, adhesives or sealants, a coating, an adhesive or a sealant comprising the modified polyisocyanate, especially use of the modified polyisocyanates in wood coatings, a process for preparing an aqueous two-component coating, a product obtained by applying said coating to substrates, and a process for producing the product.

Modified Polyisocyanates

The modified polyisocyanate of the present invention may also refer to a mixture of modified polyisocyanates.

The iminooxadiazinedione structure is represented by the formula II:

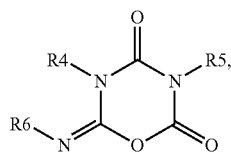

wherein R4, R5 and R6 each independently, identically or differently, represents a group which is obtained by removing one isocyanate group from an aliphatic, cycloaliphatic, aromatic and/or araliphatic diisocyanate, a group which is obtained by removing one isocyanate group from an aliphatic, cycloaliphatic, aromatic and/or araliphatic oligomeric polyisocyanate, a group which is obtained by reacting a group obtained by removing one isocyanate group from an aliphatic, cycloaliphatic, aromatic and/or araliphatic diisocyanate with aminosulfonic acid, a group which is obtained by reacting a group obtained by removing one isocyanate group from an aliphatic, cycloaliphatic, aromatic and/or araliphatic oligomeric polyisocyanate with aminosulfonic acid.

The isocyanurate structure is represented by the formula III:

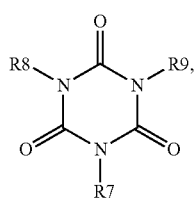

wherein R7, R8 and R9 each independently, identically or differently, represents a group which is obtained by removing one isocyanate group from an aliphatic, cycloaliphatic, aromatic and/or araliphatic diisocyanate, a group which is obtained by removing one isocyanate group from an aliphatic, cycloaliphatic, aromatic and/or araliphatic oligomeric polyisocyanate, a group which is obtained by reacting a group obtained by removing one isocyanate group from an aliphatic, cycloaliphatic, aromatic and/or araliphatic diisocyanate with aminosulfonic acid, a group which is obtained by reacting a group obtained by removing one isocyanate group from an aliphatic, cycloaliphatic, aromatic and/or araliphatic oligomeric polyisocyanate with aminosulfonic acid.

R4, R5, R6, R7, R8 and R9 may be each independently identical or different.

The weight ratio of the iminooxadiazinedione structure to the isocyanurate structure of the modified polyisocyanate is preferably 1:200 to 1:5, preferably 1:100 to 1:5, further preferably 1:100 to 1:6, further preferably 1:30 to 1:7, most preferably 1:30 to 1:20.

The total weight of the iminooxadiazinedione structure and the isocyanurate structure of the modified polyisocyanate is not less than 5% by weight, based on the amount of the modified polyisocyanate as 100% by weight.

The amount of the sulfonate group (sulfonate group means SO$_3^-$ having molar weight of 80 g/mol) of the modified polyisocyanate is preferably 0.75% by weight to 1.0% by weight, based on the amount of the modified polyisocyanate as 100% by weight.

The viscosity of the modified polyisocyanate is preferably 500 mPa·s to 7000 mPa·s, preferably 1000 mPa·s to 7000 mPa·s, most preferably 3000 mPa·s to 7000 mPa·s, as determined according to DIN EN ISO 3219:1994-10 at 23° C. and a shear rate of 10 s$^{-1}$.

Aminosulfonic Acid

R1 and R2 can preferably react with each other to form a cycloaliphatic group having 3 to 8 carbon atoms or a heterocyclic group having 3 to 8 carbon atoms substituted by an oxygen atom or a nitrogen atom, said heterocyclic group being preferably further substituted.

R3 represents preferably a linear or branched aliphatic group having 2 to 4 carbon atoms, further preferably a linear or branched aliphatic group having 2 to 3 carbon atoms, most preferably a linear or branched aliphatic group having 3 carbon atoms.

The aminosulfonic acid may be any mixture of one or more aminosulfonic acids represented by the formula I.

The aminosulfonic acid is preferably one or more of the following compounds: 3-cyclohexylaminopropane-1-sulfonic acid, 4-cyclohexylamino-1-butanesulfonic acid and 2-cyclohexylaminoethane-1-sulfonic acid, further preferably one or more of the following compounds:
3-cyclohexylaminopropane-1-sulfonic acid and 4-cyclohexylamino-1-butanesulfonic acid, most preferably 3-cyclohexylaminopropane-1-sulfonic acid The amount of the aminosulfonic acid is preferably 1.5% by weight to 3.5% by weight, further preferably 2% by weight to 3% by weight, most preferably 2.2% by weight to 2.9% by weight, based on the amount of the components a and b as 100% by weight.

Polyisocyanate

The polyisocyanate in the present invention refers to a raw material component for preparing the modified polyisocyanate.

The polyisocyanate comprises at least an iminooxadiazinedione structure and at least an isocyanurate structure.

The iminooxadiazinedione structure is represented by the formula II:

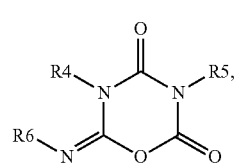

wherein R4, R5 and R6 each independently, identically or differently, represents a group which is obtained by removing one isocyanate group from an aliphatic, cycloaliphatic, aromatic and/or araliphatic diisocyanate, a group which is obtained by removing one isocyanate group from an aliphatic, cycloaliphatic, aromatic and/or araliphatic oligomeric polyisocyanate.

The isocyanurate structure is represented by the formula III:

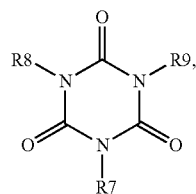

wherein R7, R8 and R9 each independently, identically or differently, represents a group which is obtained by removing one isocyanate group from an aliphatic, cycloaliphatic, aromatic and/or araliphatic diisocyanate, a group which is obtained by removing one isocyanate group from an aliphatic, cycloaliphatic, aromatic and/or araliphatic oligomeric polyisocyanate.

R4, R5, R6, R7, R8 and R9 may be each independently identical or different.

The weight ratio of the iminooxadiazinedione structure to the isocyanurate structure of the modified polyisocyanate is preferably 1:300 to 1:5, further preferably 1:200 to 1:5, still more preferably 1:100 to 1:5, still more preferably 1:100 to 1:6, still more preferably 1:30 to 1:7, most preferably 1:30 to 1:20.

The total weight of the iminooxadiazinedione structure and the isocyanurate structure is not less than 5% by weight, based on the amount of the polyisocyanate as 100% by weight.

The content of the monomeric diisocyanate of the polyisocyanate is preferably less than 1% by weight, most preferably less than 0.5% by weight.

The viscosity of the polyisocyanate is preferably 100 mPa·s to 9000 mPa·s, further preferably 500 mPa·s to 8000 mPa·s, most preferably 500 mPa·s to 6000 mPa·s, as determined according to DIN EN ISO 3219:1994-10 at a temperature of 23° C. and a shear rate of 10 s$^{-1}$.

The amount of the polyisocyanate is preferably not less than 5% by weight, based on the components of the reaction for preparing the modified polyisocyanate as 100% by weight.

The polyisocyanate is preferably one or more of the following compounds: an aliphatic polyisocyanate, a cycloaliphatic polyisocyanate, an araliphatic polyisocyanate and an aromatic polyisocyanate.

In addition to the isocyanurate structure and the iminooxadiazinedione structure, the polyisocyanate may further comprise one or more of the following structural units: urethane, biuret, uretdione and allophanate.

The polyisocyanate is preferably composed of at least two diisocyanates and are prepared by modification of simple aliphatic, cycloaliphatic, araliphatic and/or aromatic diisocyanates, for example as described in the following literatures: J. Prakt. Chem. 336 (1994) 185-200, DE-A1 670 666, DE-A 1 954 093, DE-A 2 414 413, DE-A 2 452 532, DE-A 2 641 380, DE-A 3 700 209, DE-A 3 900 053 and DE-A 3 928 503, or EP-A 0 336 205, EP-A 0 339 396 and EP-A0 798 299. The diisocyanates can be prepared by phosgenation in the liquid or gas phase or by a phosgene-free process, for example, by thermal urethane cleavage.

The weight average molecular weight of the diisocyanate is preferably 140 to 400.

The diisocyanate is preferably one or more of the following compounds: 1,4-diisocyanatobutane, 1,5-diisocyanatopentane (pentamethylene diisocyanate, PDI), 1,6-diisocyanatohexane (hexamethylene diisocyanate, HDI), 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis(isocyanatomethyl)-cyclohexane, 1,4-bis(isocyanatomethyl)-cyclohexane, 1-isocyanato-3,3,5-trimethyl-5-isocyanatomethylcyclohexane (isophorone diisocyanate, IPDI), 2,4' and 4,4'-diisocyanatodicyclohexylmethane(H$_{12}$-MDI), 1-isocyanato-1-methyl-4(3)isocyanatomethylcyclohexane, bis(isocyanatomethyl)-norbornane, 1,3- and 1,4-bis(isocyanatomethyl)benzene (xylylene diisocyanate, XDI), 1,3- and 1,4-bis(2-isocyanato-propan-2-yl)-benzene (TMXDI), 2,4-, and 2,6-diisocyanatotoluene(TDI), 2,4'-, and 4,4'-diisocyanatodiphenylmethane(MDI) and 1,5-diisocyanatonaphthalene (NDI).

The polyisocyanate is preferably one or more of the following compounds: an aliphatic polyisocyanate and a cycloaliphatic polyisocyanate, further preferably an aliphatic polyisocyanate, more preferably derivatives containing an isocyanurate structure and an iminooxadiazinedione structure which is based on one or more of the following compounds: hexamethylene diisocyanate, isophorone diisocyanate and 4,4'-diisocyanatodicyclohexylmethane, further preferably derivatives containing an isocyanurate structure and an iminooxadiazinedione structure which is based on one or more of the following compounds: hexamethylene diisocyanate and isophorone diisocyanate, most preferably derivatives containing an isocyanurate structure and an iminooxadiazinedione structure which is based on hexamethylene diisocyanate.

Tertiary Amine

The tertiary amine of the present invention is used to neutralize the sulfonic acid group of the aminosulfonic acid.

The tertiary amine is preferably one or more of the following compounds: a tertiary monoamine, a tertiary diamine, and other tertiary amines containing a group reactive toward isocyanate.

The tertiary monoamine is preferably one or more of the following compounds: trimethylamine, triethylamine, tripropylamine, tributylamine, dimethylcyclohexylamine, N-methylmorpholine, N-ethylmorpholine, N-methylpiperidine and N-ethylpiperidine and N,N-dimethylcyclohexylamine.

The tertiary diamine is preferably one or more of the following compounds: 1,3-bis-(dimethylamino)-propane, 1,4-bis-(dimethylamino)-butane, and N,N'-dimethylpiperazine.

The tertiary amine is most preferably N,N-dimethylcyclohexylamine.

The other tertiary amine comprising a group reactive toward isocyanate is preferably an alkanolamine such as dimethylethanolamine, methyldiethanolamine and/or triethanolamine The molar equivalent ratio of the tertiary amine to the sulfonate group of the aminosulfonic acid is preferably 0.3 to 1.9, most preferably 0.6 to 1.4.

The amount of the tertiary amine is sufficient to catalyze the reaction of components a, b and optionally component d. However, other conventional catalysts known in polyurethane chemistry are optionally used to accelerate the reaction in the process of the present invention. The conventional catalyst is preferably one or more of the following compounds: other tertiary amines and metal salts.

The other tertiary amine is preferably one or more of the following compounds: triethylamine, pyridine, methylpyridine, benzyldimethylamine, N,N-endoethylenepiperazine, N-methylpiperidine, pentamethyl-diethylenetriamine, N,N-dimethyl-aminocyclohexane and N,N'-dimethylpiperazine.

The metal salt is preferably one or more of the following compounds: ferric chloride, aluminum tris(ethyl acetoacetate), zinc chloride, zinc n-octanoate, zinc 2-ethyl-1-hexanoate, zinc 2-ethylcaproate, zinc stearate, zinc naphthenate, zinc acetylacetonate, tin n-octoate, tin 2-ethyl-1-hexanoate, tin ethylhexanoate, tin laurate, tin palmitate, dibutyltin oxide, dibutyltin dichloride, dibutyltin diacetate, dibutyltin maleate, dibutyltin dilaurate, dioctyltin diacetate and molybdenum glycolate.

The amount of the conventional catalyst is preferably 0.001% by weight to 2% by weight, most preferably 0.005% by weight to 0.5% by weight, based on the amount of the components of the reaction as 100% by weight.

Polyether Alcohol Containing an Ethylene Oxide Group

The polyether alcohol containing an ethylene oxide group is used in the process for preparing a modified polyisocyanate of the present invention in an amount of 0 to 17% by weight, preferably 0 to 13% by weight, most preferably 0 to 5% by weight, based on the amount of the components of the reaction as 100% by weight.

The polyether alcohol containing an ethylene oxide group preferably comprises a statistical average of 5 to 30, most preferably 7 to 25 ethylene oxide groups per molecule.

The polyether alcohol containing an ethylene oxide group can be obtained in a known manner by alkoxylation of suitable raw material molecules, for example described in Ullmanns Encyclopaedie der technischen Chemie, 4th edition, Vol. 19, Verlag Chemie Weinheim, Pages 31-38.

The suitable raw material molecule is preferably one or more of the following compounds: a saturated monohydric alcohol, an unsaturated alcohol, an aromatic alcohol, an araliphatic alcohol, a secondary monoamine, and a heterocyclic secondary amine.

The saturated monohydric alcohol is preferably one or more of the following compounds: methanol, ethanol, n-propanol, isopropanol, n-butanol, isobutanol, sec-butanol, isomeric pentanols, hexanol, octanol, nonanol, n-decyl alcohol, n-dodecyl alcohol, n-tetradecyl alcohol, n-hexadecanol, n-octadecyl alcohol, cyclohexanol, isomeric methylcyclohexanols, hydroxymethylcyclohexane, 3-ethyl-3-oxetanemethanol and tetrahydrofurfuryl alcohol.

The unsaturated alcohol is preferably one or more of the following compounds: allyl alcohol, 1,1-dimethyl-allyl alcohol, and oleyl alcohol.

The aromatic alcohol is preferably one or more of the following compounds: phenols, isomeric cresols and methoxyphenol.

The araliphatic alcohol is preferably one or more of the following compounds: benzyl alcohol, anisyl alcohol and cinnamyl alcohol.

The secondary monoamine is preferably one or more of the following compounds: dimethylamine, diethylamine, dipropylamine, diisopropylamine, di-n-butylamine, diisobutylamine, bis(2-ethylhexyl)-amine, N-methylcyclohexylamine, N-ethylcyclohexylamine and dicyclohexylamine.

The heterocyclic secondary amine is preferably one or more of the following compounds: morpholine, pyrrolidine, piperidine and 1H-pyrazole.

The suitable raw material molecule is further preferably a saturated monohydric alcohol having 1 to 4 carbon atoms, most preferably methanol.

The alkylene oxide suitable for the alkoxylation reaction, in particular ethylene oxide and/or propylene oxide, can be used in any order or as a mixture in the alkoxylation reaction.

The polyether alcohol containing an ethylene oxide group may be any mixture of one or more polyether alcohols containing an ethylene oxide group.

The alkylene oxide unit in the polyether alcohol containing an ethylene oxide group preferably contains not less than 30 mol %, and most preferably not less than 40 mol % of ethylene oxide groups.

The polyether alcohol containing an ethylene oxide group is most preferably polyethylene glycol-methylether alcohol comprising a statistical average of 7 to 30, most preferably 7 to 25 ethylene oxide groups per molecule.

The polyether alcohol containing an ethylene oxide group according to the present invention may be additionally added. Alternatively, the polyisocyanate may already comprise ethylene oxide polyether units. When the polyisocyanate already comprises ethylene oxide polyether units, the polyisocyanate is hydrophilically modified with an ethylene oxide polyether alcohol, for example, is a polyisocyanate prepared by the method described in EP A0959087, page 2, lines 25-46.

Solvent

The components of the reaction for preparing the modified polyisocyanate may further comprise a solvent.

The solvent is a conventional solvent which is known to be useful for the preparation of modified polyisocyanates, preferably one or more of the following compounds: ethyl acetate, butyl acetate, 1-methoxypropan-2-yl acetate, 3-methoxy-n-butyl acetate, acetone, 2-butanone, 4-methyl-2-pentanone, cyclohexanone, toluene, xylene, chlorobenzene, petroleum solvents, more highly substituted aromatic compounds, carbonates, lactones, propylene glycol diacetate, diethylene glycol dimethyl ether, dipropylene glycol dimethyl ether, diethylene glycol ethylether acetate, diethylene glycol butylether acetate, N-methyl pyrrolidone and N-methyl caprolactam.

The more highly substituted aromatic compound is preferably the solvent naphtha of trade names Solvesso, Isopar, Nappar and Shellsol.

The carbonate is preferably one or more of the following compounds: dimethyl carbonate, diethyl carbonate, 1,2-ethylene carbonate, and 1,2-propylene carbonate.

The lactone is preferably one or more of the following compounds: β-propiolactone, γ-butyrolactone, ε-caprolactone, and ε-methylcaprolactone.

The modified polyisocyanate is preferably obtained by a reaction of a system comprising the following components:
a. at least an aminosulfonic acid represented by the formula I;

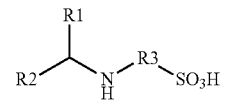

wherein,

R1 and R2 independently represents hydrogen, an aliphatic group having 1 to 18 carbon atoms which is substituted or unsubstituted and/or contains a heteroatom, a cycloaliphatic group having 3 to 18 carbon atoms which is substituted or unsubstituted and/or contains a heteroatom, an aromatic group having 1 to 18 carbon atoms which is substituted or unsubstituted and/or contains a heteroatom; R1 and R2 can react with each other to form a cycloaliphatic group having 3 to 8 carbon atoms or a heterocyclic group having 3 to 8 carbon atoms substituted by an oxygen atom or a nitrogen atom;

R3 represents a linear or branched aliphatic group having 2 to 8 carbon atoms;
  b. at least a polyisocyanate;
  c. at least a tertiary amine; and
  d. optionally a polyether alcohol containing an ethylene oxide group;

wherein the modified polyisocyanate comprises at least an iminooxadiazinedione structure and at least an isocyanurate structure, the weight ratio of the iminooxadiazinedione structure to the isocyanurate structure being 1:300 to 1:5; the amount of the sulfonate group (sulfonate group means $SO_3^-$ having molar weight of 80 g/mol) of the modified polyisocyanate is 0.75% by weight to 1.1% by weight, based on the amount of the modified polyisocyanate as 100% by weight; the viscosity of the modified polyisocyanate is 500 mPa·s to 10000 mPa·s, as determined according to DIN EN ISO 3219:1994-10 at 23° C. and a shear rate of 10 $s^{-1}$, the content of aminosulfonic acid is 1.5% by weight to 3.5% by weight, the polyisocyanate comprises at least an iminooxadiazinedione structure and at least an isocyanurate structure, the weight ratio of the iminooxadiazinedione structure to the isocyanurate structure being 1:300 to 1:5.

The modified polyisocyanate is more preferably obtained by a reaction of a system comprising the following components:
  a. 3-cyclohexylaminopropanesulfonic acid;
  b. a derivative of hexamethylene diisocyanate having an isocyanurate structure and an iminooxadiazinedione structure; and
  c. a tertiary amine;

the weight ratio of the iminooxadiazinedione structure to the isocyanurate structure of the modified polyisocyanate is 1:30 to 1:7, and the amount of the sulfonate group (sulfonate group means $SO_3^-$ having molar weight of 80 g/mol) of the modified polyisocyanate is 0.75% by weight to 1.1% by weight. %, based on the amount of the modified polyisocyanate as 100% by weight; the viscosity of the modified polyisocyanate is 500 mPa·s to 10000 mPa·s, as determined according to DIN EN ISO 3219:1994-10 at a temperature of 23° C. and a shear rate of 10 $s^{-1}$.

The tertiary amine is preferably N,N-dimethylcyclohexylamine.

The weight ratio of the iminooxadiazinedione structure to the isocyanurate structure of the modified isocyanate is preferably 1:30 to 1:20.

The amount of the sulfonate group of the modified polyisocyanate (sulfonate group means $SO_3^-$ having molar weight of 80 g/mol) is preferably 0.75% by weight to 1.0% by weight, based on the amount of the modified polyisocyanate as 100% by weight.

The viscosity of the modified polyisocyanate is preferably 500 mPa·s to 7000 mPa·s, further preferably 1000 mPa·s to 7000 mPa·s, most preferably 3000 mPa·s to 7000 mPa·s, measured according to DIN EN ISO 3219:1994-10 at a temperature of 23° C. and a shear rate of 10 $s^{-1}$.

The molar equivalent ratio of the tertiary amine to the sulfonate group of the 3-cyclohexylaminopropanesulfonic acid is preferably 0.3 to 1.9.

The amount of 3-cyclohexylaminopropanesulfonic acid is 2% by weight to 3% by weight, based on the amount of the components a and b as 100% by weight.

The weight ratio of the iminooxadiazinedione structure to the isocyanurate structure of the derivative of hexamethylene diisocyanate having an isocyanurate structure and an iminooxadiazinedione structure is preferably 1:30 to 1:7, most preferably 1:30 to 1:20.

The modified polyisocyanate is most preferably obtained by a reaction of a system comprising the following components:
  a. 3-cyclohexylaminopropanesulfonic acid, the amount of 3-cyclohexylaminopropanesulfonic acid being 2% by weight to 3% by weight, based on the amount of the components a and b as 100% by weight;
  b. a derivative of hexamethylene diisocyanate having an isocyanurate structure and an iminooxadiazinedione structure, the weight ratio of the iminooxadiazinedione structure to the isocyanurate structure of the derivative of hexamethylene diisocyanate having an isocyanurate structure and an iminooxadiazinedione structure being preferably 1:30 to 1:20; and
  c. a N,N-dimethylcyclohexylamine having a molar equivalent ratio of 0.3 to 1.9 based on the sulfonate group of the 3-cyclohexylaminopropanesulfonic acid;

the weight ratio of the iminooxadiazinedione structure to the isocyanurate structure of the modified polyisocyanate is 1:30 to 1:20; the amount of the sulfonate group (sulfonate group means $SO_3^-$ having molar weight of 80 g/mol) of the modified polyisocyanate is 0.75% by weight to 1.0% by weight, based on the amount of the modified polyisocyanate as 100% by weight; the viscosity of the modified polyisocyanate is 3000 mPa·s to 7000 mPa·s, as determined according to DIN EN ISO 3219:1994-10 at a temperature of 23° C. and a shear rate of 10 $s^{-1}$.

Process for Preparing a Modified Polyisocyanate

The process for preparing a modified polyisocyanate comprises the steps of: reacting at a temperature of 40° C. to 150° C. in the presence of component a, component b, component c and optionally component d, maintaining the molar equivalent ratio of the NCO groups to the groups reactive toward NCO group as 2:1 to 400:1.

The reaction temperature is preferably 50° C. to 130° C.

The molar equivalent ratio of the NCO groups to the groups reactive toward NCO group is preferably 4:1 to 250:1, most preferably until the theoretically calculated NCO content is reached in the reaction.

The modified polyisocyanate is transparent, colorless or nearly colorless.

Use

The modified polyisocyanate is preferably used in the form of an aqueous emulsion.

The polyisocyanate of the present invention is preferably used as a cross-linking component for a water-soluble or water-dispersible coating, adhesive or sealant which have groups reactive toward isocyanate groups, in particular hydroxyl group, and used in the production of coating layers based on such aqueous coatings, adhesives or sealants.

When the modified polyisocyanate of the present invention is used as a crosslinking component for components of a water-soluble or water-dispersible coating, the molar ratio of the NCO groups of the modified polyisocyanate to the groups reactive toward NCO group, in particular, hydroxyl groups is preferably 0.5:1 to 2:1.

When the modified polyisocyanate of the present invention is used as a crosslinking component in a water-soluble or water-dispersible adhesive or sealant, it may optionally be incorporated in a relatively small amount into a non-functional water-soluble or water-dispersible adhesive or sealant, so that very specific properties are obtained, for example as an additive to improve adhesion. For example, it is used as a papermaking auxiliary or additive which comprises no absorbable halides or for inorganic building materials such as concrete or mortar.

The coating, adhesive or sealant comprising said modified polyisocyanate may further comprise a polyisocyanate different from said modified polyisocyanate. The polyisocyanate different from said modified polyisocyanate is preferably added to said modified polyisocyanate before said modified polyisocyanate is mixed with a resin component.

The polyisocyanate different from said modified polyisocyanate is preferably used in such an amount that the properties of the coating, adhesive or sealant comprising the aqueous hydroxy resin dispersion and the modified polyisocyanate are not affected. For this combination, the modified polyisocyanate of the present invention acts as an emulsifier for the polyisocyanate different from said modified polyisocyanate.

Use in the Preparation of Polyurethanes

The modified polyisocyanate can also be used in a blocking agent-blocked form in an aqueous one-component polyurethane system. Suitable blocking agent is, for example, diethyl malonate, ethyl acetoacetate, acetoxime, butanone oxime, ε-caprolactam, 3,5-dimethylpyrazole, 1,2,4-triazole, dimethyl-1,2,4-triazole, imidazole or any mixture of these blocking agents.

The modified polyisocyanate has excellent emulsifiability in water and can be distributed uniformly. The coating layer formed from the polyurethane of said modified polyisocyanate has excellent optical properties, especially high surface gloss and high transparency.

Process for Producing a Product

Coating can be carried out using a mechanical tool known to those skilled in the art or using a two-component spray gun.

The substrate may be any substrate, preferably metal, wood, alloy, inorganic material, glass, stone, ceramic raw material, concrete, rigid synthetic material, soft synthetic material, textile, leather or paper, most preferably wood, metal, alloy or inorganic material.

The substrate may optionally have a conventional primer before it is coated.

Aqueous Two-Component Coating

The aqueous hydroxy resin dispersion is preferably a dispersion of a hydroxyl group-containing polyacrylate, and most preferably a dispersion of a hydroxyl group-containing polyacrylate having a weight average molecular weight of 1000 to 10000.

In principle, all compounds which are soluble or dispersable in water and comprise groups reactive toward isocyanate are suitable as reaction partners for aqueous two-component coatings of the present invention, for example polyurethanes or polyureas dispersed in water, wherein active hydrogen atoms are present in the urethane or urea groups, and the polyurethanes or polyureas can be cross-linked with the modified polyisocyanate.

The aqueous two-component coating may optionally comprise conventional auxiliaries and additives in the field of coatings, such as one or more of the following substances: flow aids, coloring pigments, fillers, defoamers, cosolvents, matting agents, and emulsifiers.

The coating layer formed by drying the aqueous two-component coating at room temperature has good properties.

The aqueous two-component coating may also be dried at elevated temperatures or dried at temperatures up to 260° C.

The aqueous two-component coating may be a wood coating, a textile coating, a plastic coating, an architectural coating or a metal coating, most preferably a wood coating.

EXAMPLES

Unless defined otherwise, all technical and scientific terms used herein have the same meaning as commonly understood by those skilled in the art of the present invention. When the definition of a term in this specification contradicts the meaning as commonly understood by those skilled in the art, the definitions described here shall prevail.

Unless stated otherwise, all numbers expressing the amount of ingredients, reaction conditions, and the like, as used in the specification and claims, are understood to be modified by the term "about." Accordingly, unless indicated to the contrary, the numerical parameters set forth herein are approximations that can be varied according to properties as desired.

Unless otherwise stated, "a", "an", and "the" as used in this specification are meant to include "at least one" or "one or more". For example, "a component" refers to one or more components, and thus more than one component may be contemplated and employed or used in the implementation of embodiments.

As used herein, "and/or" refers to one or all of the elements mentioned.

As used herein, "including" and "comprising" encompass the cases in which only the elements mentioned are present and also the cases in which other unmentioned elements are present in addition to the mentioned elements.

All percentages in the present invention are percentages by weight unless otherwise stated.

The analytical measurements of the present invention were carried out at 23° C. unless otherwise stated.

The weight ratio of the iminooxadiazinedione structure to the isocyanurate structure in the polyisocyanate was determined by $^{13}$C NMR. The test instrument was Bruker DPX-400. The weight ratio of iminooxadiazinedione structure: isocyanurate structure=1: (integral area @148.4 ppm)/(integral area @147.9 ppm+integral area @144.5 ppm+integral area @135.3 ppm).

In the reaction for preparing the modified polyisocyanate from the polyisocyanate of the present invention, the weight ratio of the iminooxadiazinedione structure to the isocyanurate structure in the modified polyisocyanate is the same as the weight ratio of the iminooxadiazinedione structure to the isocyanurate structure in the polyisocyanate.

The viscosity was determined according to DIN EN ISO 3219:1994-10 at a temperature of 23° C. and a shear rate of 10 s$^{-1}$. MV-DIN rotor was selected.

The isocyanate group (NCO) content was determined according to DIN-EN ISO 11909:2007-05.

The measured data refer to free and potentially free NCO content.

Standard of color value test: DIN-EN1557:1997-03.
Standard of gloss test: GB/T 9754-2007.
Standard of haze test: ASTM E430-11.
Raw Materials and Reagents Polyisocyanate P1: A four-necked flask equipped with a stirrer, a thermometer, a reflux cooling tube, a nitrogen injection tube, and a dropping funnel was set under a nitrogen atmosphere. 850 g of hexamethylene diisocyanate (HDI) was added thereto, and heated to 65° C. with stirring. Then 5.5 g of trimethyl-2-methyl-2-hydroxyethylammonium hydroxide (a solution diluted to 5% by weight with isobutanol) was added as catalyst. When the NCO content of the reaction liquid was 45.6% by weight, the reaction was terminated by adding 1.1 g of di-n-butyl phosphate. The unreacted monomers were removed by a thin film evaporator at temperature of 140° C. and vacuum of 0.05 mbar. A Polyisocyanate P1 was obtained with a nonvolatile content of 100% by weight, a viscosity of 1200 mPa·s (23.5° C.), a NCO content of 23.0% by weight, a HDI monomer concentration of 0.25% by weight, and a weight ratio of iminooxadiazinedione structure to isocyanurate structure of 1:27.57.

Polyisocyanate P2: The method for preparing P1 was carried out. The reaction was terminated when the NCO content of the reaction liquid was 38%. The unreacted monomers were removed by a thin film evaporator at temperature of 140° C. and vacuum of 0.05 mbar. Polyisocyanate P2 was obtained with a nonvolatile content of 100% by weight, a viscosity of 3000 mPa·s (23.5° C.), a NCO content of 21.7% by weight, a HDI monomer concentration of 0.25% by weight, and a weight ratio of iminooxadiazinedione structure to isocyanurate structure of 1:20.28.

Polyisocyanate P3: The method for preparing P1 was carried out. The reaction was terminated when the NCO content of the reaction liquid was 32%. The unreacted monomers were removed by a thin film evaporator at temperature of 140° C. and vacuum of 0.05 mbar. Polyisocyanate P3 was obtained with a nonvolatile content of 100% by weight, a viscosity of 16000 mPa·s (23.5° C.), a NCO content of 20.0% by weight, a HDI monomer concentration of 0.25% by weight, and a weight ratio of iminooxadiazinedione structure to isocyanurate structure of 1:27.57.

Polyisocyanate P4: The method for preparing P1 was carried out. Tetrabutylphosphonium hydrogendifluoride solution was used as catalyst (diluted to 50% with a solvent of isopropanol/methanol with a weight ratio of 2:1). The reaction was terminated by adding dibutyl phosphate when the NCO content of the reaction liquid was 32%. Polyisocyanate P4 was obtained with a nonvolatile content of 100% by weight, a viscosity of 700 mPa·s (23.5° C.), a NCO content of 23.4% by weight, a HDI monomer concentration of 0.25% by weight, and a weight ratio of iminooxadiazinedione structure to isocyanurate structure of 1:1.28.

Tolonate HDT-LV2: a commercial product based on hexamethylene diisocyanate with a NCO content of 23.0% by weight and a HDI monomer concentration of less than 0.5% by weight, a weight ratio of iminooxadiazinedione structure to isocyanurate structure lower than the detection limit, available from VENCOREX.

Tetrabutylphosphonium hydrogendifluoride solution: purchased from Jinjinle Chemical Company.

Isopropanol: purchased from Sigma-Aldrich.

Methanol: purchased from Sigma-Aldrich.

3-Cyclohexylaminopropanesulfonic acid: purchased from Sigma-Aldrich.

N,N-Dimethylcyclohexylamine: purchased from Sigma-Aldrich.

Trimethyl-2-methyl-2-hydroxyethylammonium hydroxide: purchased from Sigma-Aldrich.

Bayhydrol A 2470: Aqueous hydroxy acrylate dispersion, available from Covestro, Germany.

BYK 028: Silicone defoamer (a mixture of foam-destroying polysiloxanes and hydrophobic particles in polyethylene glycol), purchased from BYK, Germany.

BYK 346: Wetting leveling agent (polyether modified siloxane solution), available from BYK, Germany.

BUTYL CELLOSOLVE: cosolvent, ethylene glycol butyl ether, purchased from Dow Chemical, USA RHEOVIS PU 1291: Rheology additive, associative thickener: hydrophobic modified ethoxylated urethane, purchased from BASF, Germany.

Modified Polyisocyanate 1

27 g (0.14 eq) of polyisocyanate P2, 100 g (0.53 eq) of Tolonate HDT-LV2, 3.6 g (0.016 eq) of 3-cyclohexylaminopropanesulfonic acid and 2.08 g (0.016 mol) of dimethylcyclohexylamine were stirred under dry nitrogen at 80° C. for 4 hours and cooled to room temperature. A modified polyisocyanate of the present invention was obtained with the following characteristic data, said modified polyisocyanate being in a form of a colorless transparent solution:

Solid content: 100% by weight NCO content: 20.78% by weight Viscosity (23° C.): 2907 mPa·s Color value (Hazen): 57 Sulfonate group content: 0.98% by weight (sulfonate group means $SO_3^-$ having molar weight of 80 g/mol)

Iminooxadiazinedione/isocyanurate: 1:100

Ethylene oxide group content: 0.0% by weight

Modified Polyisocyanate 2

215.44 g (1.10 eq) of polyisocyanate P2, 502.5 g (2.72 eq) of polyisocyanate P1, 20.3 g (0.09 eq) of 3-cyclohexylaminopropanesulfonic acid and 11.7 g (0.09 mol) of dimethylcyclohexylamine were stirred under dry nitrogen at 80° C. for 4 hours and cooled to room temperature. A modified polyisocyanate of the present invention was obtained with the following characteristic data, said modified polyisocyanate being in a form of a colorless transparent solution:

Solid content: 100% by weight

NCO content: 21.32% by weight

Viscosity (23° C.): 3293 mPa·s

Color value (Hazen): 18

Sulfonate group content: 0.98% by weight (sulfonate group means $SO_3^-$ having molar weight of 80 g/mol)

Iminooxadiazinedione/isocyanurate: 1:26.07

Ethylene oxide group content: 0.0% by weight

Modified Polyisocyanate 3

1705 g (8.74 eq) of polyisocyanate P2, 48.3 g (0.22 eq) of 3-cyclohexylaminopropanesulfonic acid and 27.8 g (0.22 mol) of dimethylcyclohexylamine were stirred under dry nitrogen at 80° C. for 4 hours and cooled to room temperature. A modified polyisocyanate of the present invention was obtained with the following characteristic data, said modified polyisocyanate being in a form of a colorless transparent solution:

Solid content: 100% by weight

NCO content: 20.47% by weight

Viscosity (23° C.): 5992 mPa·s

Color value (Hazen): 7

Sulfonate group content: 0.98% by weight (sulfonate group means $SO_3^-$ having molar weight of 80 g/mol)

Iminooxadiazinedione/isocyanurate: 1:21.2

Ethylene oxide group content: 0.0% by weight

Modified Polyisocyanate 4

657 g (3.37 eq) of polyisocyanate P2, 69.8 g (0.39 eq) of polyisocyanate P4, 20.6 g (0.09 eq) of 3-cyclohexylaminopropanesulfonic acid and 11.9 g (0.09 mol) of dimethylcyclohexylamine were stirred under dry nitrogen at 80° C. for 4 hours and cooled to room temperature. A modified polyisocyanate of the present invention was obtained with the following characteristic data, said modified polyisocyanate being in a form of a colorless transparent solution:

Solid content: 100% by weight

NCO content: 20.11% by weight

Viscosity (23° C.): 6645 mPa·s Color value (Hazen): 18
Sulfonate group content: 0.98% by weight (sulfonate group means $SO_3^-$ having molar weight of 80 g/mol)
  Iminooxadiazinedione/isocyanurate: 1:11.35
  Ethylene oxide group content: 0.0% by weight
  Modified Polyisocyanate 5
  565.01 g (2.90 eq) of polyisocyanate P2, 131 g (0.73 eq) of polyisocyanate P4, 19.7 g (0.09 eq) of 3-cyclohexylaminopropanesulfonic acid and 11.9 g (0.09 mol) of dimethylcyclohexylamine were stirred under dry nitrogen at 80° C. for 4 hours and cooled to room temperature. A modified polyisocyanate of the present invention was obtained with the following characteristic data, said modified polyisocyanate being in a form of a colorless transparent solution:
    Solid content: 100% by weight
    NCO content: 20.7% by weight
    Viscosity (23° C.): 4690 mPa·s
    Color value (Hazen): 17
    Sulfonate group content: 0.98% by weight (sulfonate group means $SO_3^-$ having molar weight of 80 g/mol)
    Iminooxadiazinedione/isocyanurate: 1:7.67
    Ethylene oxide group content: 0.0% by weight
  Modified Polyisocyanate 6
  718 g (3.68 eq) of polyisocyanate P2, 16.3 g (0.07 eq) of 3-cyclohexylaminopropanesulfonic acid and 8.82 g (0.07 mol) of dimethylcyclohexylamine were stirred under dry nitrogen at 80° C. for 4 hours and cooled to room temperature. A mixture of modified polyisocyanates of the present invention was obtained with the following characteristic data, said mixture of modified polyisocyanates being in a form of a colorless transparent solution:
    Solid content: 100% by weight
    NCO content: 20.6% by weight
    Viscosity (23° C.): 5743 mPa·s
    Color value (Hazen): 20
    Sulfonate group content: 0.79% by weight (sulfonate group means $SO_3^-$ having molar weight of 80 g/mol)
    Iminooxadiazinedione/isocyanurate: 1:21.03
    Ethylene oxide group content: 0.0% by weight
  Modified Polyisocyanate 7
  125 g (0.6 eq) of modified polyisocyanate 3, 1.92 g (0.005 mol) of monofunctional polyethylene oxide polyether alcohol started from methanol and having an average molecular weight of 350 were stirred under dry nitrogen at 95° C. for 4 hours and cooled to room temperature. A modified polyisocyanate was obtained with the following characteristic data, said modified polyisocyanate being in a form of a colorless transparent solution:
    Solid content: 100% by weight
    NCO content: 19.46% by weight
    Viscosity (23° C.): 9839 mPa·s
    Color value (Hazen): 0
    Sulfonate group content: 0.96% by weight (sulfonate group means $SO_3^-$ having molar weight of 80 g/mol)
    Iminooxadiazinedione/isocyanurate: 1:21.3
    Ethylene oxide group content: 1.4% by weight
  Comparative Modified Polyisocyanate 1
  718.21 g (3.68 eq) of polyisocyanate P2, 12.78 g (0.06 eq) of 3-cyclohexylaminopropanesulfonic acid and 7.72 g (0.06 mol) of dimethylcyclohexylamine were stirred under dry nitrogen at 80° C. for 4 hours and cooled to room temperature. A comparative modified polyisocyanate was obtained with the following characteristic data, said comparative modified polyisocyanate being in a form of a colorless transparent solution:
    Solid content: 100% by weight
    NCO content: 20.85% by weight
    Viscosity (23° C.): 5296 mPa·s
    Color value (Hazen): 14
    Sulfonate group content: 0.62% by weight (sulfonate group means $SO_3^-$ having molar weight of 80 g/mol)
    Iminooxadiazinedione/isocyanurate: 1:20.89
    Ethylene oxide group content: 0.0% by weight
  Comparative Modified Polyisocyanate 2
  718.02 g (3.68 eq) of polyisocyanate P2, 15.24 g (0.07 eq) of 3-cyclohexylaminopropanesulfonic acid and 8.82 g (0.07 mol) of dimethylcyclohexylamine were stirred under dry nitrogen at 80° C. for 4 hours and cooled to room temperature. A comparative modified polyisocyanate was obtained with the following characteristic data, said comparative modified polyisocyanate being in a form of a colorless transparent solution:
    Solid content: 100% by weight
    NCO content: 20.26% by weight
    Viscosity (23° C.): 7012 mPa·s
    Color value (Hazen): 20
    Sulfonate group content: 0.73% by weight (sulfonate group means $SO_3^-$ having molar weight of 80 g/mol)
    Iminooxadiazinedione/isocyanurate: 1:20.98
    Ethylene oxide group content: 0.0% by weight
  Comparative Modified Polyisocyanate 3
  718.1 g (3.68 eq) of polyisocyanate P2, 24 g (0.11 eq) of 3-cyclohexylaminopropanesulfonic acid and 14.01 g (0.11 mol) of dimethylcyclohexylamine were stirred under dry nitrogen at 80° C. for 4 hours and cooled to room temperature. A comparative modified polyisocyanate was obtained with the following characteristic data, said comparative modified polyisocyanate being in a form of a colorless transparent solution:
    Solid content: 100% by weight
    NCO content: 19.76% by weight
    Viscosity (23° C.): 9361 mPa·s
    Color value (Hazen): 18
    Sulfonate group content: 1.15% by weight (sulfonate group means $SO_3^-$ having molar weight of 80 g/mol)
    Iminooxadiazinedione/isocyanurate: 1:21.41
    Ethylene oxide group content: 0.0% by weight
  Comparative Modified Polyisocyanate 4
  717.9 g (3.42 eq) of polyisocyanate P3, 20.31 g (0.09 eq) of 3-cyclohexylaminopropanesulfonic acid and 11.7 g (0.09 mol) of dimethylcyclohexylamine were stirred under dry nitrogen at 80° C. for 4 hours and cooled to room temperature. A comparative modified polyisocyanate was obtained with the following characteristic data, said comparative modified polyisocyanate being in a form of a colorless transparent solution:
    Solid content: 100% by weight
    NCO content: 17.64% by weight
    Viscosity (23° C.): 32740 mPa·s
    Color value (Hazen): 24
    Sulfonate group content: 0.98% by weight (sulfonate group means $SO_3^-$ having molar weight of 80 g/mol)
    Iminooxadiazinedione/isocyanurate: 1:27.57
    Ethylene oxide group content: 0.0% by weight
  Comparative Modified Polyisocyanate 5
  428.7 g (2.20 eq) of polyisocyanate P2, 285.12 g (1.58 eq) of polyisocyanate P4, 20.32 g (0.09 eq) of 3-cyclohexylaminopropanesulfonic acid and 11.7 g (0.09 mol) of dimethylcyclohexylamine were stirred under dry nitrogen at 80° C. for 4 hours and cooled to room temperature. A comparative modified polyisocyanate was obtained with the following characteristic data, said comparative modified polyisocyanate being in a form of a colorless transparent solution:

Solid content: 100% by weight
NCO content: 20.9% by weight
Viscosity (23° C.): 3501 mPa·s
Color value (Hazen): 16
Sulfonate group content: 0.98% by weight (sulfonate group means $SO_3^-$ having molar weight of 80 g/mol)
Iminooxadiazinedione/isocyanurate: 1:4.15
Ethylene oxide group content: 0.0% by weight Process for Preparing Aqueous Two-Component Coatings of Examples and Comparative Examples Formulation of component A: According to the formulation listed in Table 1, a defoamer, a leveling agent, a cosolvent, a rheology additive and water were sequentially added to the hydroxyacrylic resin or the hydroxypolyurethane resin. It was dispersed at a high speed of 1500 rpm for 20 minutes. Component A was thus obtained.

TABLE 1

Formulation of component A

| Formulation | Weight/g |
|---|---|
| Bayhydrol A2470 | 70 |
| BYK 028 | 0.5 |
| BYK 346 | 0.5 |
| BUTYL CELLOSOLVE | 2 |
| RHEOVIS PU 1291 | 1 |
| Deionized water | 26 |
| Total weight | 100 |

50 g of component A and the modified polyisocyanate of the present invention or the comparative modified polyisocyanate (the molar ratio of isocyanate groups to hydroxyl groups being 1.5:1) were mixed, manually stirred using a wooden stick for 30 seconds. Aqueous two-component coatings of Examples and Comparative Examples were thus obtained.

Test Method of Water Dispersibility 7.5 g of water was added to the aqueous two-component coating. The mixture was manually stirred uniformly and filtered by a 100-mesh filter sieve. The residues on the filter sieve were visually observed. The fewer residues exist on the filter sieve, the better is the dispersibility of the modified polyisocyanate in the resin system. According to the amount of the residues on the filter sieve, the dispersibility of the modified polyisocyanate in the resin system was rated as 1 to 3. 1 means a large amount of residues on the filter sieve; 2 means relatively many residues on the filter sieve; 3 means almost no residue on the filter sieve. 1 means the worst, 3 means the best.

Test Conditions for Gloss and Haze 7.5 g of water was added to the aqueous two-component coatings. The mixture was manually stirred uniformly and filtered by a 100-mesh filter sieve. The filtered coating was applied to a black plastic plate with a wet film thickness of 120 μm, and dried in air. A coating layer was thus obtained and the gloss and haze thereof were measured.

Evaluation standard for gloss and haze: 60° gloss>80, haze value<100. A larger 60° gloss value indicates a higher gloss of a coating layer, and a larger haze value indicates a lower transparency of a coating layer.

Table 2 shows formulations and test results of the aqueous two-component coatings of Examples 1-5 and Comparative Example 1.

Table 3 shows formulations and test results of the aqueous two-component coatings of Examples 3, 6 and Comparative Examples 2-4.

Table 4 shows formulations and test results of the aqueous two-component coatings of Examples 3, 7 and Comparative Example 5.

Table 5 shows formulations and test results of the aqueous two-component coatings of Examples 3, 8 and Comparative Examples 1, 6.

Table 2 Formulations and test results of the aqueous two-component coatings of Examples 1-5 and Comparative Example 1

| | Ex. 1 Modified polyisocyanate 1 Component A | Ex. 2 Modified polyisocyanate 2 Component A | Ex. 3 Modified polyisocyanate 3 Component A | Ex. 4 Modified polyisocyanate 4 Component A | Ex. 5 Modified polyisocyanate 5 Component A | Comp. Ex. 1 Comparative Modified polyisocyanate 5 Component A |
|---|---|---|---|---|---|---|
| Test Results | | | | | | |
| Dispersibility | 3 | 3 | 3 | 3 | 3 | 1 |
| 60° gloss | 91 | 91.3 | 91.2 | 89.5 | 91.7 | 90.4 |
| Haze value | 49.5 | 39.2 | 39.6 | 41.5 | 42.7 | 43.9 |

The weight ratio of the iminooxadiazinedione structure to the isocyanurate structure of the modified polyisocyanates contained in the aqueous two-component coatings of Examples 1-5 was 1:300 to 1:5. Especially 1:100 to 1:5, the aqueous two-component coatings had almost no residue on the filter sieve, and the modified polyisocyanates showed good dispersibility in coating components, i.e., the coatings could be manually stirred well, and the coating layers formed by the coatings showed excellent transparency and gloss.

The weight ratio of the iminooxadiazinedione structure to isocyanurate structure in the comparative modified polyisocyanate contained in the comparative aqueous two-component coating of Comparative Example 1 was 1:4.15. The coating layer formed by the coating showed excellent transparency and gloss. However, the aqueous two-component coating had a large amount of residues on the filter sieve, and the comparative modified polyisocyanate showed poor dispersibility in coating components, i.e., the ability to stir the coating manually was poor.

TABLE 3

Formulations and test results of aqueous two-component coatings of Examples 3 and 6 and Comparative Examples 2-4

| | Ex. 3 Modified polyisocyanate 3 Component A | Ex. 6 Modified polyisocyanate 6 Component A | Comp. Ex. 2 Comparative modified polyisocyanate 1 Component A | Comp. Ex. 3 Comparative modified polyisocyanate 2 Component A | Comp. Ex. 4 Comparative modified polyisocyanate 3 Component A |
|---|---|---|---|---|---|
| | | | Test Results | | |
| Dispersibility | 3 | 3 | 3 | 3 | 2 |
| 60° gloss | 91.2 | 81.1 | 71.8 | 48.2 | 91.5 |
| Haze value | 39.6 | 72.6 | 237 | 342 | 47 |

The content of the sulfonate group of the modified polyisocyanates contained in the aqueous two-component coatings of Examples 3 and 6 was 0.75% by weight to 1.1% by weight. The aqueous two-component coatings had almost no residue on the filter sieve. The modified polyisocyanates had good dispersibility in coating components, i.e., the coatings could be manually stirred well, and the coating layers formed by the coatings had excellent transparency and gloss.

The content of the sulfonate group of the comparative modified polyisocyanate contained in the comparative aqueous two-component coatings of Comparative Example 2-4 was lower or higher than 0.75% by weight to 1.1% by weight. The aqueous two-component coatings had relatively many residues on the filter sieve. The comparative modified polyisocyanates showed poor dispersibility in coating components, i.e., the ability to stir the coating manually was poor. Or, the coating layers formed by the coatings showed poor transparency and gloss.

TABLE 4

Formulations and test results of the aqueous two-component coatings of Examples 3, 7 and Comparative Example 5

| | Ex. 3 Modified polyisocyanate 3 Component A | Ex. 7 Modified polyisocyanate 7 Component A | Comp. Ex. 5 Comparative modified polyisocyanate 4 Component A |
|---|---|---|---|
| | | Test Results | |
| Dispersibility | 3 | 3 | 2 |
| 60° gloss | 91.2 | 90.9 | 59.5 |
| Haze value | 39.6 | 43.2 | 289 |

The viscosities of the modified polyisocyanates contained in the aqueous two-component coatings of Examples 3 and 7 were 500 mPa·s to 10000 mPa·s. The aqueous two-component coatings had almost no residue on the filter sieve. The modified polyisocyanates showed good dispersibility in coating components, i.e., the coatings could be manually stirred well. The coating layers formed by the coatings showed excellent transparency and gloss.

The comparative modified polyisocyanate contained in the comparative aqueous two-component coating of Comparative Example 5 had a viscosity of more than 10000 mPa·s. The coating layer formed by the coating showed poor transparency and gloss. The aqueous two-component coating had relatively many residues on the filter sieve. The comparative modified polyisocyanate showed poor dispersibility in coating components, i.e., the ability to stir the coating manually was poor.

TABLE 5

Formulations and test results of the aqueous two-component coatings of Examples 3 and 8 and Comparative Examples 1 and 6

| | Ex. 3 Modified polyisocyanate 3 Component A | Ex. 8 80% by weight of modified polyisocyanate 3, dissolved in propylene glycol methyl ether acetate (MPA) Component A | Comp. Ex. 1 Comparative modified polyisocyanate 5 Component A | Comp. Ex. 6 80% by weight of comparative modified polyisocyanate 5, dissolved in propylene glycol methyl ether acetate (MPA) Component A |
|---|---|---|---|---|
| | | Test Results | | |
| Dispersibility | 3 | 3 | 1 | 3 |
| 60° gloss | 91.2 | 90.9 | 90.4 | 91 |
| Haze value | 39.6 | 44.6 | 43.9 | 43.4 |

Whether the modified polyisocyanates contained in the aqueous two-component coatings were diluted with an organic solvent or not, the aqueous two-component coatings had almost no residue on the filter sieve. The modified polyisocyanates showed good dispersibility in coating components, i.e., the coatings could be manually stirred well. The coating layers formed by the coatings showed excellent transparency and gloss.

The comparative modified polyisocyanate contained in the comparative aqueous two-component coating of Comparative Example 1 showed poor dispersibility in coating components. After the comparative modified polyisocyanate was diluted with an organic solvent (Comparative Example 6), its dispersibility was improved greatly.

It is apparent to those skilled in the art that the present invention is not limited to the specific details described above, and the present invention may be embodied in other specific forms without departing from the spirit or main features of the present invention. Thus, the embodiments should be considered in all respects as illustrative and not restricting. The scope of the present invention is thus defined by the claims rather than the foregoing description. Thus any change, as long as it falls within the meaning and scope of the equivalents to the claims, is considered as belonging to the present invention.

The invention claimed is:

1. A modified polyisocyanate obtained by a reaction of a system comprising the following components:
   a. at least an aminosulfonic acid represented by the formula I;

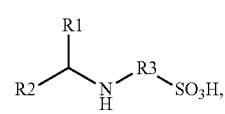

wherein,
R1 and R2 each independently represents hydrogen, an aliphatic group having 1 to 18 carbon atoms which is substituted or unsubstituted and/or contains a heteroatom, a cycloaliphatic group having 3 to 18 carbon atoms which is substituted or unsubstituted and/or contains a heteroatom, an aromatic group having 1 to 18 carbon atoms which is substituted or unsubstituted and/or contains a heteroatom; R1 and R2 can react with each other to form a cycloaliphatic group having 3 to 8 carbon atoms or a heterocyclic group having 3 to 8 carbon atoms substituted by an oxygen atom or a nitrogen atom;

R3 represents a linear or branched aliphatic group having 2 to 8 carbon atoms;

b. at least a polyisocyanate;

c. at least a tertiary amine; and d. optionally a polyether alcohol containing an ethylene oxide group;

wherein the modified polyisocyanate comprises at least an iminooxadiazinedione structure and at least an isocyanurate structure, the weight ratio of the iminooxadiazinedione structure to the isocyanurate structure being 1:300 to 1:5; the amount of the sulfonate group of the modified polyisocyanate is 0.75% by weight to 1.1% by weight, based on the amount of the modified polyisocyanate as 100% by weight; the viscosity of the modified polyisocyanate is 500 mPa·s to 10000 mPa·s, as determined according to DIN EN ISO 3219:1994-10 at a temperature of 23° C. and a shear rate of 10 $s^{-1}$.

2. The modified polyisocyanate according to claim 1, characterized in that the modified polyisocyanate has a weight ratio of the iminooxadiazinedione structure to the isocyanurate structure of 1:200 to 1:5.

3. The modified polyisocyanate according to claim 1, characterized in that the modified polyisocyanate has a viscosity of 500 mPa·s to 7000 mPa·s, as determined according to DIN EN ISO 3219:1994-10 at a temperature of 23° C. and a shear rate of 10 $s^{-1}$.

4. The modified polyisocyanate according to claim 1, characterized in that the amount of the sulfonate group of the modified polyisocyanate is 0.75% by weight to 1.0% by weight, based on the amount of the modified polyisocyanate as 100% by weight.

5. The modified polyisocyanate according to claim 1, characterized in that R3 represents a linear or branched aliphatic group having 2 to 4 carbon atoms.

6. The modified polyisocyanate according to claim 1, characterized in that the aminosulfonic acid is one or more of the following compounds: 3-cyclohexylaminopropanesulfonic acid, 4-(cyclohexylamino)-1-butanesulfonic acid and 2-(cyclohexylamino)ethanesulfonic acid.

7. The modified polyisocyanate according to claim 1, characterized in that the amount of the aminosulfonic acid is 1.5% by weight to 3.5% by weight, based on the amount of the components a and b as 100% by weight.

8. The modified polyisocyanate according to claim 1, characterized in that the polyisocyanate comprises at least an iminooxadiazinedione structure and at least an isocyanurate structure, the weight ratio of the iminooxadiazinedione structure to the isocyanurate structure being 1:300 to 1:5.

9. The modified polyisocyanate according to claim 1, characterized in that the polyisocyanate is one or more of the following compounds: an aliphatic polyisocyanate and a cycloaliphatic polyisocyanate.

10. The modified polyisocyanate according to claim 1, characterized in that the polyether alcohol containing an ethylene oxide group has an ethylene oxide group content of 0 to 17% by weight, based on the amount of components of the reaction as 100% by weight.

11. The modified polyisocyanate according to claim 1, characterized in that the modified polyisocyanate is obtained by a reaction of a system comprising the following components:

a. 3-cyclohexylaminopropanesulfonic acid;

b. a derivative of hexamethylene diisocyanate having an isocyanurate structure and an iminooxadiazinedione structure; and c. a tertiary amine;

wherein the weight ratio of the iminooxadiazinedione structure to the isocyanurate structure of the modified polyisocyanate is 1:30 to 1:7, and the amount of the sulfonate group of the modified polyisocyanate is 0.75% by weight to 1.1% by weight, based on the amount of the modified polyisocyanate as 100% by weight; the viscosity of the modified polyisocyanate is 500 mPa·s to 10000 mPa·s, as determined according to DIN EN ISO 3219:1994-10 at a temperature of 23° C. and a shear rate of 10 $s^{-1}$.

12. The modified polyisocyanate according to claim 1, characterized in that the modified polyisocyanate is obtained by a reaction of a system comprising the following components:

a. 3-cyclohexylaminopropanesulfonic acid, the amount of 3-cyclohexylaminopropanesulfonic acid being 2% by weight to 3% by weight, based on the amount of the components a and b as 100% by weight;

b. a derivative of hexamethylene diisocyanate having an isocyanurate structure and an iminooxadiazinedione structure, the weight ratio of the iminooxadiazinedione structure to the isocyanurate structure of the derivative of hexamethylene diisocyanate having an isocyanurate structure and an iminooxadiazinedione structure being preferably 1:30 to 1:20; and c. N,N-dimethylcyclohexylamine present at a molar equivalent ratio of 0.3 to 1.9 based on the sulfonate group of the 3-cyclohexylaminopropanesulfonic acid;

wherein the weight ratio of the iminooxadiazinedione structure to the isocyanurate structure of the modified polyisocyanate is 1:30 to 1:20; the amount of the sulfonate group of the modified polyisocyanate is 0.75% by weight to 1.0 weight %, based on the amount of the modified polyisocyanate as 100% by weight; the viscosity of the modified polyisocyanate is 3000 mPa·s to 7000 mPa·s, as determined according to DIN EN ISO 3219:1994-10 at a temperature of 23° C. and a shear rate of 10 $s^{-1}$.

13. A coating, an adhesive or a sealant comprising the modified polyisocyanate according to claim 1.

14. A substrate coated with the coating, adhesive or sealant according to claim 13.

15. An aqueous two-component coating comprising at least an aqueous hydroxy resin dispersion, at least a modified polyisocyanate according to claim 1, optionally an auxiliary and optionally an additive.

16. A process for preparing an aqueous two-component coating comprising the steps of: mixing an aqueous hydroxy resin dispersion, optionally an auxiliary, and optionally an additive in any manner to obtain a mixture, mixing the modified polyisocyanate according to claim 1 and said mixture, and stirring manually to obtain the aqueous two-component coating.

17. A product comprising a substrate and a coating formed by applying the aqueous two-component coating according to claim 15 to the substrate.

18. The product according to claim 17, characterized in that the substrate is wood, metal, alloy or an inorganic material.

19. The product according to claim 17, characterized in that the product is furniture.

20. A process for producing a product, comprising the step of applying the aqueous two-component coating according to claim 15 to a substrate, followed by curing and drying.

\* \* \* \* \*